July 24, 1928.
F. G. LILJENROTH
1,678,518
PROCESS OF MAKING A MIXTURE OF NITROGEN AND HYDROGEN
Filed Oct. 17, 1922
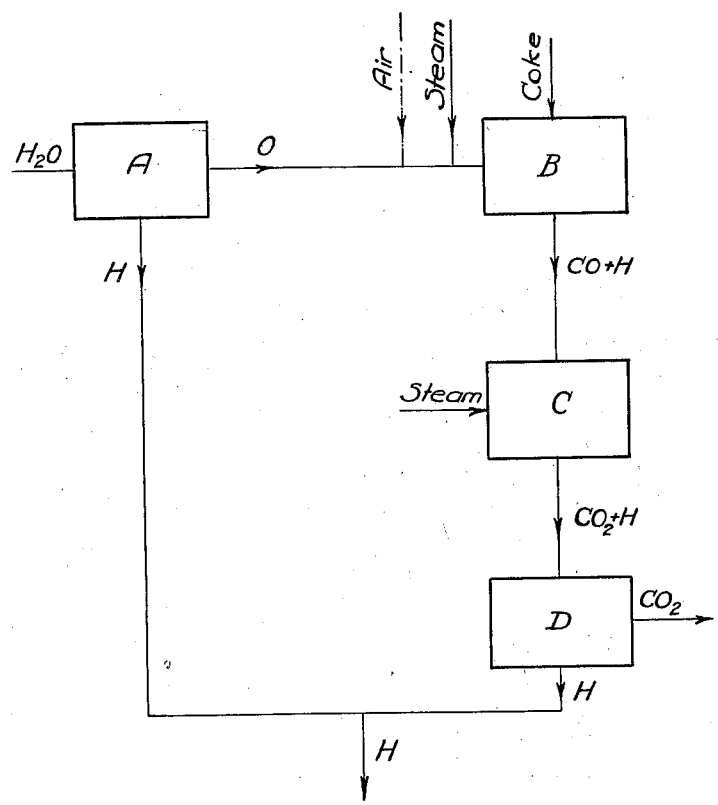

Patented July 24, 1928.

1,678,518

UNITED STATES PATENT OFFICE.

FRANS GEORG LILJENROTH, OF STOCKSUND, SWEDEN.

PROCESS OF MAKING A MIXTURE OF NITROGEN AND HYDROGEN.

Application filed October 17, 1922, Serial No. 595,171, and in Sweden December 3, 1921.

This invention relates to an improved method of producing a mixture of nitrogen and hydrogen.

Hydrogen was hitherto produced in a large scale either by electrolytically decomposing water or by reducing steam by means of incandescent coke in water gas generators. The first-mentioned method has the advantage that pure hydrogen is at once produced but at the same time has the drawback that an expensive plant and an ample supply of cheap electric power are required. The latter method does not produce immediately pure hydrogen gas but so-called water gas which consists of a mixture of equal volumes of hydrogen and carbon monoxide. The latter constituent can, however, easily be converted by a catalytical process by means of steam into carbon dioxide and the mixture then be purified by removing the carbon dioxide, the resulting product being essentially pure hydrogen gas.

The water gas reaction, as is well known, is endothermic and heat must be supplied in some convenient manner. Usually this is effected by combusting a part of the coke in the gas generator by means of atmospheric oxygen. If the supply of the air takes place simultaneously with the reduction of the steam a gas is obtained which is diluted by at least 50% by volume of nitrogen, such gas being suitable for heat or power generation only but not for the synthetic production of ammonia. For the latter purpose theoretically a gas mixture of 75% by volume of hydrogen and 25% by volume of nitrogen is needed. For obtaining a gas having such small percentage of nitrogen the gas generator must be operated in such manner that the air and the steam are supplied alternately to the generator and the combustion gases when supplying the air be removed. The process with an alternating supply of air and steam is, however, essentially less economical than a continuous process based on a simultaneous supply of air and steam.

The object of this invention is to improve the continuous water gas process in such manner that it can be used for producing in an economical manner a mixture of hydrogen and nitrogen suitable for the synthetic manufacture of ammonia.

The invention consists, chiefly, in combining the producing of hydrogen by means of the water gas process and subsequent reaction upon the carbon monoxide of the water gas by means of steam with the electrolysis of water in such manner that the generation of the water gas is effected by means of the electrolytically produced oxygen together with steam and atmospheric air in such regulated quantities that the percentage of the nitrogen of the gas produced will be about one third by volume of the total quantity of the hydrogen produced.

In the usual continuous water gas process a gas is generally obtained containing approximately:

|  | Per cent. |
|---|---|
| Hydrogen | 15 |
| Carbon monoxide | 30 |
| Carbon dioxide | 5 |
| Nitrogen | 50 |

A gas mixture of such composition cannot be used for the synthetic manufacture of ammonia. For increasing the percentage of hydrogen and utilizing the carbon monoxide the latter constituent is generally oxidized by catalytic re-action with steam whereupon the carbon dioxide is removed. The resulting gas mixture consists then of about 45 parts by volume of hydrogen and 50 parts by volume of nitrogen. Also such gas mixture is unsuitable for the synthetic producing of ammonia. For adjusting the proportions so as to obtain the ratio of $3H_2:N_2$ requested for the manufacture of ammonia an addition of 105 parts by volume of hydrogen would evidently be necessary. The producing of such large quantities of hydrogen by other processes, for instance by electrolysis, would not be economical. For avoiding said drawback I produce a water gas containing less than 50% but more than 25% of nitrogen and a corresponding higher percentage of hydrogen and carbon monoxide. The carbon monoxide of said water gas is then in well-known manner oxidized by a catalytic re-action with steam and the carbon dioxide removed. The proportions of electrolytic oxygen, atmospheric air and steam used for the water gas process are so related to each other that the percentage of nitrogen supplied by the air is substantially one third of the hydrogen obtained from the water gas together with the electrolytic hydrogen. When the electrolytic hydrogen then is added to the purified mixture of hydrogen and nitrogen obtained from the water gas a gas mixture is obtained which consists of hydrogen and nitrogen substantially in the ratio 3:1 as requested for the synthetic manufacture of ammonia. A calculation shows that it generally will be sufficient to produce about one fourth to about one third of the total quantity of hydrogen by electrolysis while the remainder is obtained from water gas produced by utilizing the electrolytic oxygen as above described.

According to this combined process it will be possible to produce economically the gas mixture requested for the synthetic manufacture of ammonia in countries which have ample supply of cheap hydro-electric power but where the coal price is comparatively high.

In the accompanying drawing I have shown diagrammatically an apparatus for carrying out the process.

Referring to the drawings, A designates an electrolytic plant in which water is decomposed into hydrogen and oxygen. The oxygen produced in the plant A is mixed with air and steam and the mixture is supplied to a continuously operated gas generator B which is charged with coke. The gas generated in B consisting essentially of carbon monoxide and hydrogen is conducted to an apparatus C of a well-known construction, to which also is supplied superheated steam and in which the carbon monoxide reacts with the steam so that it is oxidized to carbon dioxide while hydrogen is set free from the steam. The gas mixture leaving the apparatus consists essentially of carbon dioxide and hydrogen. Said gas mixture is supplied to a scrubber or any other apparatus D wherein the carbon dioxide is removed. The remaining gas consisting essentially of hydrogen is collected together with the hydrogen gas coming from the electrolytic plant A.

The economy of the process may be improved by preheating the gases supplied to the gas generator either by electrical heat or by means of the heat of the gases leaving the gas generator or by a combination of both methods.

What I claim is:—

1. Method of producing a gas mixture containing substantially hydrogen and nitrogen in certain proportions, which comprises electrolytically decomposing water into oxygen and hydrogen, using the oxygen obtained together with steam and atmospheric air for continuously operating a water gas generator, converting the carbon monoxide of the water gas generated by means of steam into carbon dioxide while setting hydrogen free, removing the carbon dioxide and mixing the remaining gas with the hydrogen obtained in the electrolysis, the supply of electrolytic oxygen, atmospheric air and steam to the water gas generator being so regulated that the nitrogen of the generator gas will be about one third by volume of the total quantity of hydrogen produced.

2. The method of producing a gas mixture of hydrogen and nitrogen for synthesis of ammonia, which comprises electrolytically decomposing water, generating a gas mixture from incandescent carbonaceous material, air and the oxygen resulting from the aforesaid decomposition, to produce a mixture low in nitrogen content, converting the carbon monoxide content of such gas into carbon di-oxide by catalytic action with steam, removing the resulting carbon di-oxide, combining the remaining gas with the hydrogen from the electrolysis to a final product, and regulating the production of the gas mixture to produce such final product having a content of hydrogen three times its nitrogen content, by the pure oxygen from the electrolysis.

In testimony whereof I have signed my name.

FRANS GEORG LILJENROTH.